(12) United States Patent
Kusase

(10) Patent No.: US 6,608,424 B2
(45) Date of Patent: Aug. 19, 2003

(54) ROTARY ELECTRIC MACHINE HAVING ANNULAR ROTOR CORE WITH SLITS

(75) Inventor: Shin Kusase, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/271,769

(22) Filed: Oct. 17, 2002

(65) Prior Publication Data

US 2003/0076004 A1 Apr. 24, 2003

(30) Foreign Application Priority Data

Oct. 22, 2001 (JP) ......................... 2001-323598

(51) Int. Cl.[7] ........................... H02K 1/27; H02K 21/14
(52) U.S. Cl. ............. 310/263; 310/156.07; 310/156.66; 310/156.72; 310/217; 310/261
(58) Field of Search ................. 310/156.07, 156.66, 310/156.67, 156.68, 156.69, 156.71, 156.72, 156.73, 156.03, 263, 261, 216–217

(56) References Cited

U.S. PATENT DOCUMENTS 4,409,506 A * 10/1983 Ito et al. ..................... 310/166
5,187,401 A * 2/1993 Rahman ................. 310/156.03
6,342,745 B1 * 1/2002 Sakai et al. ............. 310/156.56

FOREIGN PATENT DOCUMENTS

| DE | 199 09 813 | * | 9/1999 | ............ H02K/1/27 |
| JP | 4-165950 | * | 6/1992 | .......... H02K/21/04 |
| JP | 11-332190 | * | 11/1999 | .......... H02K/19/22 |
| JP | 2001-78376 | * | 3/2002 | ............ H02K/1/27 |

* cited by examiner

*Primary Examiner*—Burton Mullins
(74) *Attorney, Agent, or Firm*—Oliff & Berridge, PLC

(57) ABSTRACT

In an alternating current generator, a rotor is provided radially inside a stator core. A rotor core has a cylindrical boss press-fit around a rotor shaft, disc portions extending from an outer periphery of the boss in a radial direction, and claw pieces in connecting with the disc portions radially outside the boss. A field winding is provided between the boss and claw pieces. An annular core is provided on an outer periphery of the claw pieces. The annular core is made of a stack of core sheets and has slits formed in the radial direction. Iron loss is decreased and leaks of magnetic fluxes in the annular core are suppressed by the slits.

6 Claims, 4 Drawing Sheets

ROTARY ELECTRIC MACHINE HAVING ANNULAR ROTOR CORE WITH SLITS

CROSS-REFERENCE TO RELATED APPLICATION

This application is based on Japanese Patent Application No. 2001-323598 filed on Oct. 22, 2001, the disclosure of which is incorporated herein by reference.

FIELD OF THE INVENTION

The present invention relates to a rotary electric machine mounted on vehicles, aircraft and the like.

BACKGROUND OF THE INVENTION

A vehicular alternating current generator is required to be compact, light weight, high power and high performance, to improve fuel efficiency of a vehicle. As a means of improving power output, for example, a multi-poles single field winding type rotor, what is called a Lundell-type field rotor, is known. In the Lundell-type rotor, a field winding is concentrically wound around a core on a rotor shaft so that a large magnetomotive force is supplied to each pole of a stator.

The Lundell-type field rotor is an eternal art. The Lundell-type field rotor has been begun to use from 1903s in commercial power stations such as in Germany. Recently, it is used just in a field of such as automobile requiring downsizing, high-power generation and weight reduction. In the background, there is difficulty in improving power generation efficiency in a power generator having the Lundell-type rotor.

For example, solid magnetic poles cause large iron loss due to magnetic flux fluctuation caused during transfer between the rotor and a stator core. Also, because it is difficult to form a fine magnetic pole surface corresponding to a cosine function curve, the magnetic pole surface becomes a cylindrical surface. Even when it is formed into a trapezoidal magnetic pole form to provide salient pole form efficiency, it tends to increase a magnetic flux passing through the stator core. Therefore, it is still difficult to decrease iron loss. Further, it is difficult to suppress armature reaction.

SUMMARY OF THE INVENTION

The present invention is made in view of the above disadvantages, and it is an object of the present invention to improve power generation efficiency in a rotary electric machine having a Lundell-type field winding rotor.

According to an aspect of the present invention, a rotary electric machine has a stator and a rotor. In the stator, multi-phase windings are wound around a stator core. The rotor is provided radially inside the stator core. The rotor has a cylindrical boss press-fit around a rotor shaft, disc portions extending radially outward from the boss, claw pieces connected with the disc portions radially outside the boss, and a field winding located between the boss and the claw pieces. Also, the rotor has an annular core radially outside the claw pieces. The annular core is made of a stack of annular steel sheets and has slits formed in the radial direction.

Since the annular core is provided radially outside the claw pieces, iron loss is decreased. Further, since the annular core has slits formed in the radial direction, leaks of magnetic fluxes from the claw pieces are suppressed with the slits. Accordingly, power generation efficiency of the rotary electric machine having the Lundell-type rotor can be improved.

BRIEF DESCRIPTION OF THE DRAWINGS

Other objects, features and advantages of the present invention will become more apparent from the following detailed description made with reference to the accompanying drawings, in which.

DETAILED DESCRIPTION OF PREFERRED EMBODIMENT

Preferred embodiments of the present invention will be described hereinafter with reference to the drawings.

[First embodiment]

Figure 1:
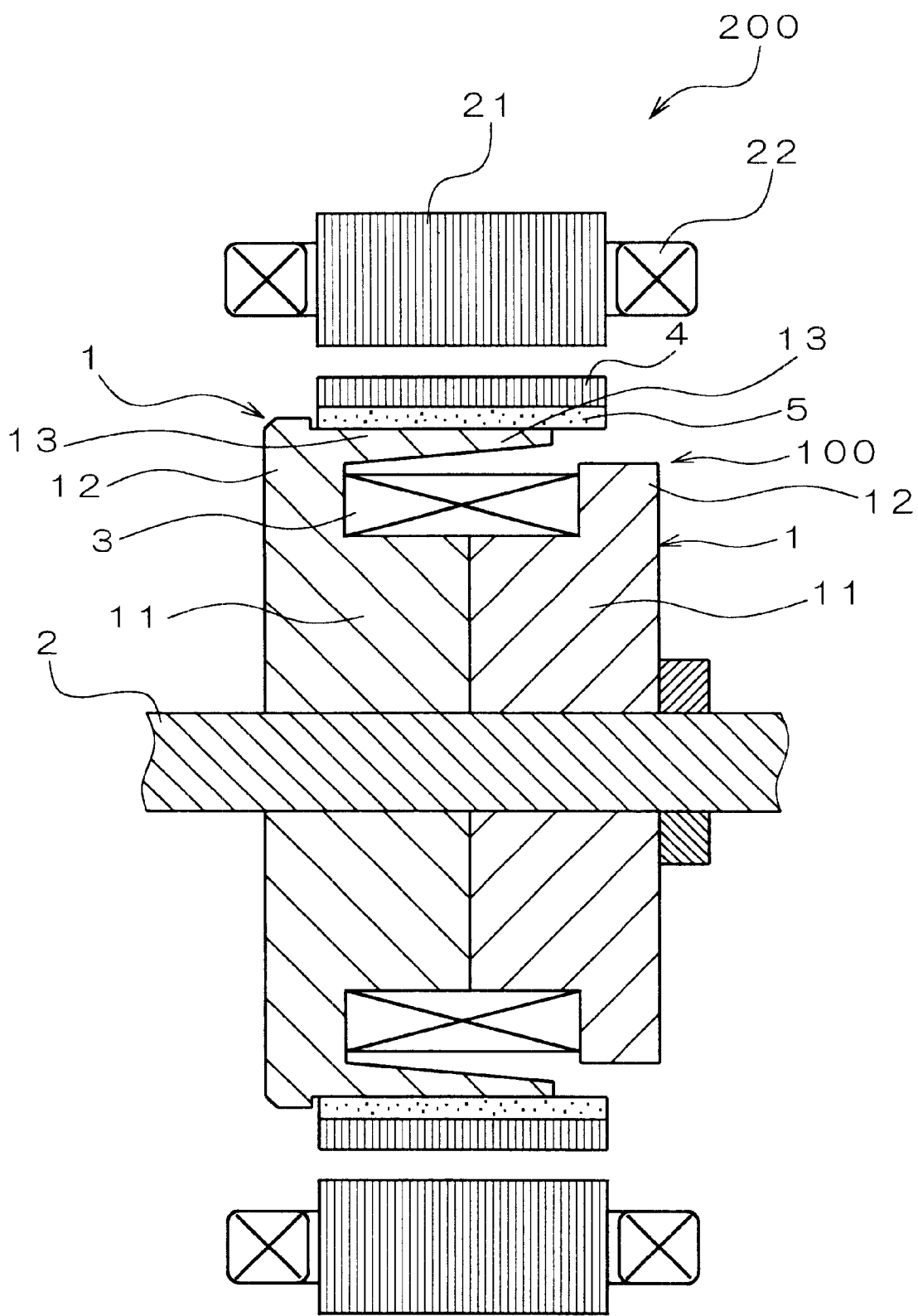
FIG. 1 is a cross-sectional view illustrating a partial structure of a vehicular alternating current generator according to the first embodiment of the present invention.

FIG. 1 is a partial cross-sectional view of a vehicular alternating current generator, and a rotor 100 and a stator 200 are mainly illustrated. The stator 200 has a stator core 21 and multi-phase windings 22. The stator core 21 is formed with a plurality of slots (not shown) opening radially inward. The multi-phase windings 22 are wound through the slots. The multi-phase windings 22 are, for example, three-phase windings including X, Y and Z phases.

The rotor 100 is a Lundell-type magnetic field rotor. The rotor 100 has a pair of rotor cores 1, a rotor shaft 2, a field winding 3, an annular core 4, and permanent magnets 5. The rotor core 1 includes a cylindrical boss 11, a disc portion 12, and claw-shaped support portions (claw pieces) 13. The boss 11 is press-fit around the rotor shaft 2. The disc portion 12 extends from an outer periphery of the boss 11 in the radial direction.

The claw pieces 13 are connected with the disc portion 12 and extended in the axial direction of the rotor shaft 2. The claw pieces 13 are located radially outside of the boss 11 and arranged to surround the boss 11. The pair of rotor cores 1 is fixed on the rotor shaft 2 such that claw pieces 13 of one of the rotor core 1 mesh with the claw pieces 13 of the opposite rotor core 1. The field winding 3 is wound around the boss 11 and is supplied with electricity through slip rings (not shown).

Figure 2:
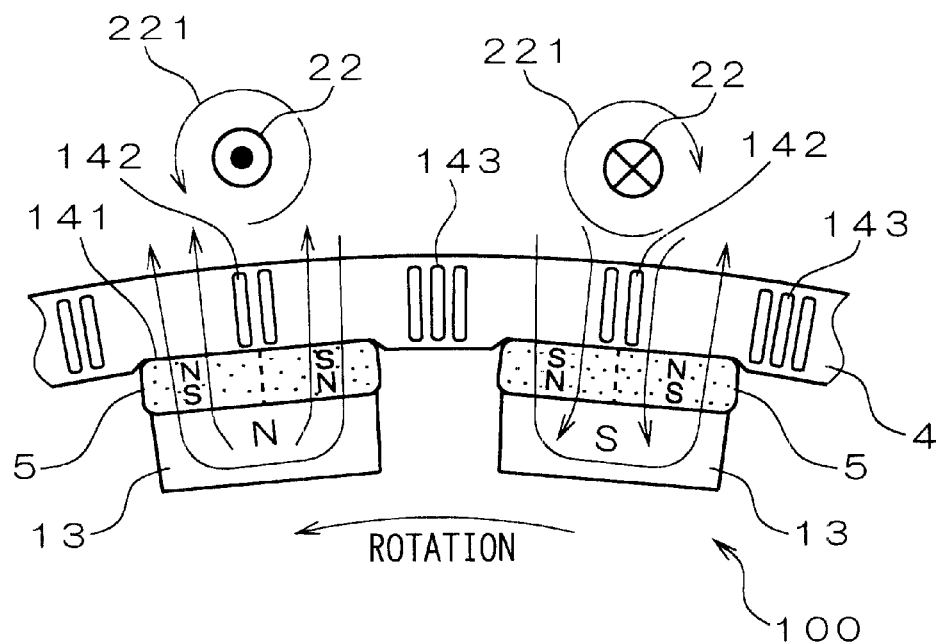
FIG. 2 is a partial cross-sectional view of a rotor illustrated in FIG. 1.

The annular core 4 is an annular member surrounding the claw pieces 13 of the rotor cores 1. The annular core 4 is made of a stack of annular magnetic steel sheets. For example, the thickness of the steel sheet is 0.5 mm. The annular core 4 is located radially outside of the claw pieces 13 and spaced from the outer periphery of the claw pieces 13 at a predetermined distance. As shown in FIG. 2, recessed portions 141 are formed on the inner peripheral wall of the annular core 4 at positions corresponding to claw pieces 13. The permanent magnets 5 are fixed between the recessed portions 14 and the claw pieces 13.

Because the outer peripheries of the permanent magnets 5 are received in the recessed portions 141, the permanent magnets 5 are positioned in the circumferential direction of the annular core 4. The permanent magnets 5 are magnetized with hybrid polarities. As shown in FIG. 2, the radially outer surface of the permanent magnet 5 is magnetized such that the leading half with respect to a rotation direction of the rotor 100 has the same polarity as that of a corresponding claw piece 13 and the trailing half with respect to the rotation direction has the opposite polarity to that of the corresponding claw piece 13.

The annular core 4 has first slits (pole-center slits) 142 and second slits (pole-intermediate slits) 143 in the circumferential direction. The slits 142, 143 are extended in the radial direction of the annular core 4. The first slits 142 are located in a substantially middle of the claw piece 13 in the circumferential direction, at the radial outside the claw piece 13. The second slits 143 are located between the adjacent claw pieces 13 in the circumferential direction, at the radial outside the claw pieces 13.

For example, the width of the first slit 142 in the circumferential direction is substantially 0.5 mm and the width of the second slit 143 in the circumferential direction is substantially 1.0 mm. Also, a radial thickness of the annular core 4 where the slit is formed, that is, a length from a peripheral edge of the annular core 4 to an end of the slit, is substantially 0.5 mm. The slits 142, 143 are formed by pressing and punching the magnetic steel sheets. In FIG. 2, for example, the first slits 142 are arranged in pairs and the second slits 143 are arranged in triplets. However, these numbers of slits 142, 143 are optional.

Next, operation of the rotor 100 and stator 200 are described.

When a direct excitation current is applied to the field winding 3 by a voltage regulator (not shown), magnetomotive force is produced in the bosses of the rotor cores 1 and the claw pieces 13 are magnetized with the north pole or the south pole through the disc portions 12. The pair of rotor cores 1 is mounted such that the claw pieces 13 of one of the cores 1 intermesh with the claw pieces 13 of the opposite core 1 in the axial direction. Therefore, when it is viewed from the outside of the magnetic field, that is, from the radially outside of the stator core 21, the north poles and south poles are alternately arranged in the circumferential direction.

In the annular core 4, the second slits 143 are between first regions and second regions, the first regions being parts of the annular core 4 corresponding to the claw pieces 13 magnetized with the north pole and the second regions being parts of the annular core 4 corresponding to the claw pieces 13 magnetized with the south pole. Therefore, the second slits 143 become magnetic barriers, thereby suppressing magnetic leaks between the first regions and second regions in the annular core 4. On the other hand, the magnetic polarities of the claw pieces 13 are continuously propagated to the annular core 4. Therefore, the north poles and south poles alternately appear on the outer peripheral surface of the annular core 4 opposing to the stator core 21.

With the rotation of the rotor 100 in which north poles and south poles alternately appear on the outer peripheral surface of the annular core 4, main magnetic fluxes are supplied to the stator core 21. That is, rotating magnetic fields in accordance with the rotation of the rotor 100 are generated and supplied to the stator core 21. Therefore, the multi-phase windings 22 wound around the stator core 21 produce electromotive forces. The electromotive forces are rectified with a rectifier and outputted.

Since the armature current is produced in the multi-phase windings 22, armature reaction magnetic fluxes 221 are produced, as shown in FIG. 2. The armature reaction magnetic flux 221 tries to flow in the annular core 4 to cross in the single pole. However, because the first slits 142 become large magnetic resistance in the annular core 4, the first slits 142 interrupt the flow of the magnetic flux 221. Accordingly, the magnetic flux 221 tries to flow through the permanent magnet 5 and claw piece 13. However, a relatively large opposed magnetic field is provided in the permanent magnet 5 and claw piece 13 by magnetization of the permanent magnet 5. Therefore, the armature reaction magnetic flux 221 cannot pass through the permanent magnet 5 and claw piece 13. Accordingly, the armature reaction is decreased.

In the first embodiment, since the rotor 100 has the annular core 4 that is made of a stack of the core sheets, magnetic poles produced in the rotor 100 become laminated states. Therefore, as compared with a conventional solid core, iron loss is decreased in this rotor 100. With this, power generation efficiency is improved. Also, the permanent magnets 5 are provided between the claw pieces 13 and the annular-core 4. The annular core 4 is formed with the first slits 142 and second slits 143. With this, the armature reaction magnetic fluxes 221 passing in the magnetic poles of the rotor 100 can be suppressed. Therefore, the armature reaction is decreased, thereby decreasing impedance drop and internal magnetic fluxes. Accordingly, the iron loss is decreased also in the stator 200, thereby improving the power generation efficiency. With the decrease in the impedance drop, the power output is improved.

An output characteristics is measured in a vehicular alternating current generator in which a diameter of the stator core 21 is 128 mm, a rated output voltage is 12 V, and a rated output current is 150 A, for example. In the alternating current generator of the present embodiment, the power generation efficiency is 76% and the output current is 177 A. In the conventional vehicular alternating current generator, which has the same size, the power generation efficiency is 70% and the output current is 153 A. Therefore, it is realized that the output characteristics is highly improved in the present embodiment.

[Second embodiment]

Figure 3:
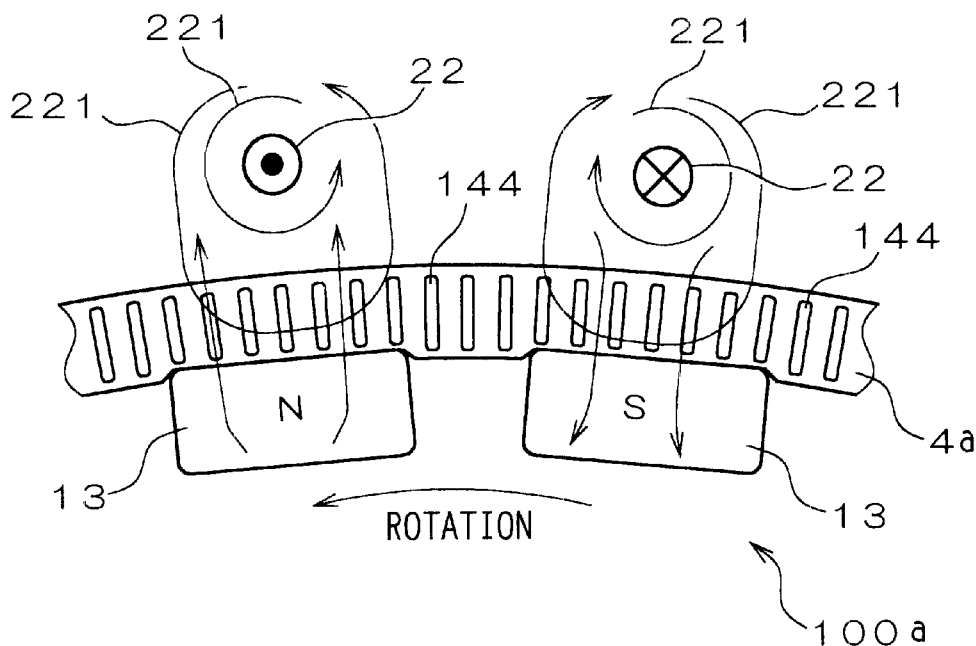
FIG. 3 is a partial cross-sectional view of a rotor according to the second embodiment of the present invention.

In the alternating current generator of the second embodiment, a rotor 100a has an annular core 4a, as shown in FIG. 3. The rotor 100a does not have the permanent magnets 5. The annular core 4a is formed with a plurality of slits 144 radiated over an entire circumference. The slits 144 are magnetic barriers.

Because the armature reaction is decreased with the radial slits 144, the permanent magnets can be eliminated. Since the permanent magnets are not required, the number of parts is decreased, thereby reducing manufacturing costs.

[Third embodiment]

Figure 4:
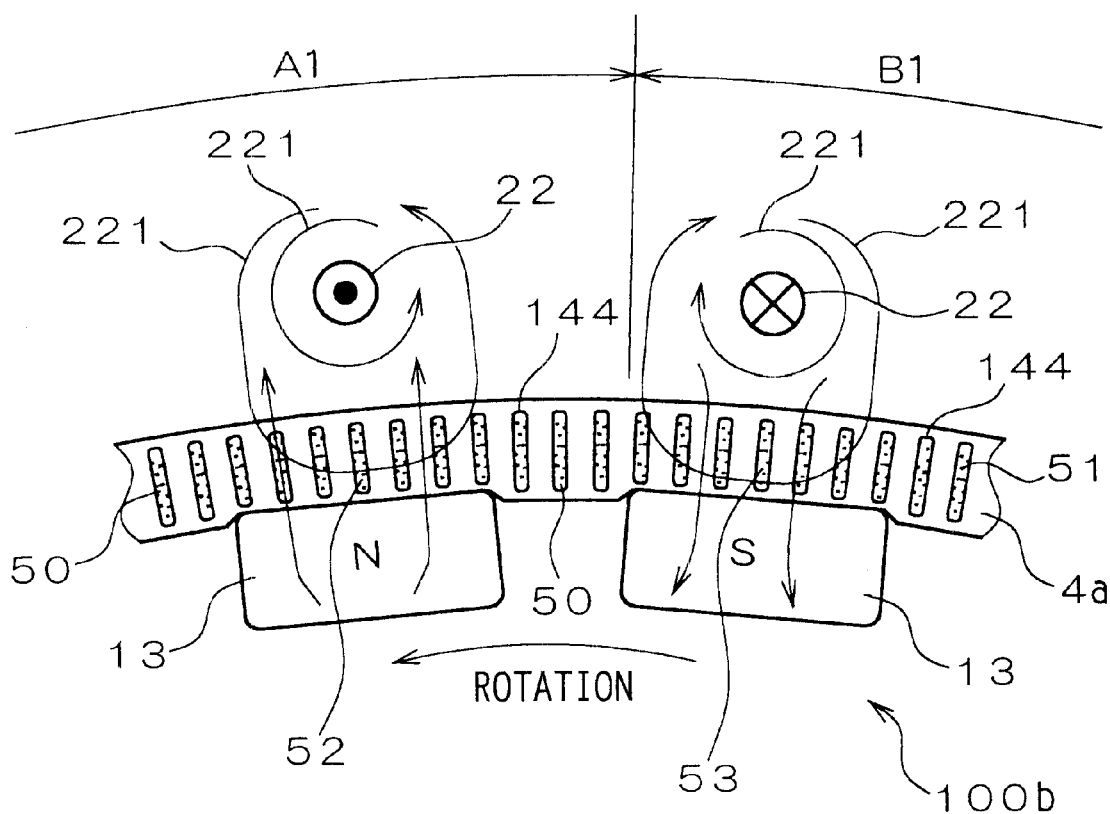
FIG. 4 is a partial cross-sectional view of a rotor according to the third embodiment of the present invention.

In the alternating current generator of the third embodiment, a rotor 100b has the annular core 4a and two kinds of permanent magnets 50, 51. As shown in FIG. 4, the permanent magnets 50, 51 are provided in the slits 144. The permanent magnets 50 and 51 are magnetized along the circumferential direction of the annular core 4a.

Figure 5:
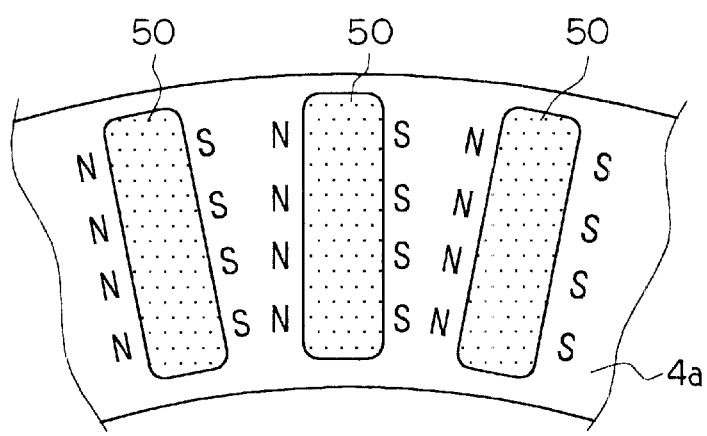
FIG. 5 is a schematic illustration of a permanent magnet according to the third embodiment of the present invention.

More specifically, the permanent magnets 50 located in an area A1 in FIG. 4 are magnetized to interrupt the armature reaction magnetic flux 221 that flows in the annular core 4a in a clockwise direction of the annular core 4a. That is, as shown in FIG. 5, the permanent magnets 50 are magnetized such that upstream side with respect to the clockwise direction is the north pole and downstream side with respect to the clockwise direction is the south pole.

Figure 6:
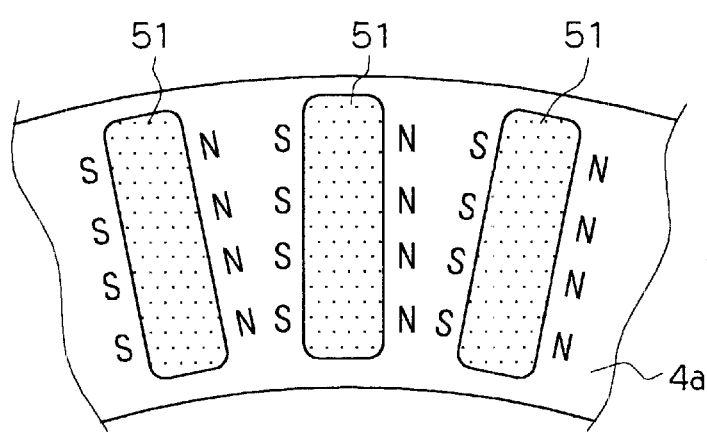
FIG. 6 is a schematic illustration of a permanent magnet according to the third embodiment of the present invention.

Also, the permanent magnets 51 located in an area B1 in FIG. 4 are magnetized to interrupt the armature reaction magnetic flux 221 that flows in the annular core 4a in the counterclockwise direction of the annular core 4a. That is, as shown in FIG. 6, the permanent magnets 51 are magnetized such that an upstream side with respect to the counterclockwise direction is the north pole and a downstream side with respect to the counterclockwise direction is the south pole. The permanent magnets 50 between the adjacent claw pieces 13 suppress leaks of the magnetic fluxes 221 between the adjacent claw pieces 13.

Since the permanent magnets 50, 51 are fitted in the slits 144 of the annular core 4a, the permanent magnets 50, 51 prevent the leaks of the magnetic fluxes 221 from the claw pieces 13. Also, the permanent magnets 50, 51 intensify the magnetic fluxes 221 that pass from the claw pieces 13 toward the stator core 22. The opposed magnetic fields are applied to the components of the armature reaction magnetic fluxes 221, which pass in the annular core 4a, at the position adjacent to the stator core 22. With this, the power generation efficiency and power output are improved.

Figure 7:
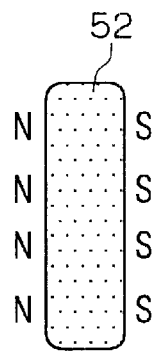
FIG. 7 is a schematic illustration of a permanent magnet according to the third embodiment of the present invention.

For example, a permanent magnet 52, which is one of the magnets 50 in the area A1, is magnetized such that the upstream side (left side in FIG. 7) with respect to the clockwise direction is the north pole and the downstream side (right side in FIG. 7) with respect to the clockwise direction is the south pole, as shown in FIG. 7. The permanent magnet 52 acts to decrease the armature reaction magnetic flux 221 that passes in the annular core 4 in the clockwise direction.

Figure 8:
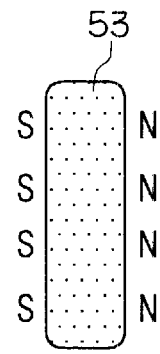
FIG. 8 is a schematic illustration of a permanent magnet according to the third embodiment of the present invention.

Also, the permanent magnet 53, which is one of the magnets 51 in the area B1 in FIG. 4, is magnetized such that the upstream side (right side in FIG. 8) with respect to the counterclockwise direction is the north pole and the downstream side (left side in FIG. 8) with respect to the counterclockwise direction is the south pole, as shown in FIG. 8. Therefore, the permanent magnet 53 acts to decrease the armature reaction magnetic flux 221 that passes in the annular core 4a in the counterclockwise direction.

The present invention is not limited to be used in the vehicular alternating current generator, but used in motors or generators used for the other purposes.

The present invention should not be limited to the disclosed embodiments, but may be implemented in other ways without departing from the spirit of the invention.

What is claimed is:

1. A rotary electric machine comprising:

a stator having a stator core that is wound with multiphase windings; and a rotor located radially inside the stator core to generate magnetic fields, wherein the rotor has a rotor shaft, a cylindrical boss fixed around the rotor shaft, disc portions extending from an outer periphery of the boss in a radial direction, claw pieces connected with the disc portions radially outside the boss, a field winding located between the boss and claw pieces, and an annular core located on an outer periphery of the claw pieces, wherein the annular core is made of a stack of core sheets and has slits extending in the radial direction.

2. The rotary electric machine according to claim 1, wherein the slits are arranged at least between adjacent claw pieces in a circumferential direction, radially outside the claw pieces.

3. The rotary electric machine according to claim 2, further comprising permanent magnets between the annular core and the claw pieces, wherein each of the permanent magnets is in contact with the annular core at its radial outer surface, and is magnetized such that a leading half of the radial outer surface with respect to a rotation direction of the rotor has a same magnetic polarity as that of a corresponding claw piece and a trailing half of the radial outer surface with respect to the rotation direction has an opposite polarity to that of the corresponding claw piece.

4. The rotary electric machine according to claim 3, wherein at least one slit is arranged in a substantially middle of each claw piece in the circumferential direction, radially outside the claw piece.

5. The rotary electric machine according to claim 1, wherein the slits radiate from a center of the annular core over an entire circumference.

6. The rotary electric machine according to claim 1, further comprising permanent magnets, wherein the permanent magnets are provided in the slits and magnetized along a circumferential direction of the annular core.

* * * * *